(12) United States Patent
Hoffman

(10) Patent No.: US 7,887,200 B2
(45) Date of Patent: Feb. 15, 2011

(54) BIT WEIGHTING ALIGNMENT IN A DISPLAY DEVICE

(75) Inventor: Brent William Hoffman, Whitestown, IN (US)

(73) Assignee: TTE Technology, Inc., Indianapolis, IN (US)

( * ) Notice: Subject to any disclaimer, the term of this patent is extended or adjusted under 35 U.S.C. 154(b) by 461 days.

(21) Appl. No.: 12/092,867

(22) PCT Filed: Nov. 9, 2005

(86) PCT No.: PCT/US2005/040803

§ 371 (c)(1),
(2), (4) Date: May 7, 2008

(87) PCT Pub. No.: WO2007/055694

PCT Pub. Date: May 18, 2007

(65) Prior Publication Data

US 2008/0316318 A1  Dec. 25, 2008

(51) Int. Cl.
G03B 21/14 (2006.01)
H04N 17/00 (2006.01)

(52) U.S. Cl. ........................ 353/121; 348/771
(58) Field of Classification Search .................... 353/85, 353/121, 122, 69; 348/771; 345/207, 690, 345/691, 692, 694; 349/5, 7; 359/291, 292
See application file for complete search history.

(56) References Cited

U.S. PATENT DOCUMENTS

| | | | | |
|---|---|---|---|---|
| 5,369,266 A | * | 11/1994 | Nohda et al. | 250/208.1 |
| 5,392,142 A | * | 2/1995 | Mitsutake et al. | 349/77 |
| 5,416,618 A | * | 5/1995 | Juday | 349/1 |
| 6,128,055 A | * | 10/2000 | Park | 349/77 |
| 6,347,014 B1 | * | 2/2002 | Hayashi et al. | 359/634 |

(Continued)

FOREIGN PATENT DOCUMENTS

WO WO2006/036727 A1 4/2006

OTHER PUBLICATIONS

PCT International Search Report and Written Opinion, mailed May 3, 2006, 10 pp.

Primary Examiner—William C Dowling
(74) Attorney, Agent, or Firm—Fletcher Yoder P.C.

(57) ABSTRACT

The disclosed embodiments relate to a method and apparatus to align bit weights in a display device. There is provided a method for calibrating light output in a display device, the method comprising: displaying a first video pattern, the first video pattern comprising a first set of pixels divided into a first subset of pixels and a second subset of pixels, the first subset of pixels having a first intensity level, the second subset of pixels having an intensity level corresponding to a fully off state; measuring a first light output value associated with the first video pattern; displaying a second video pattern, the second video pattern comprising a second set of pixels, each of the second set of pixels having a second intensity level corresponding to a fraction of the first intensity level, the fractional value of second intensity level being determined so that a second light output value associated with the second video pattern is intended to equal the first light output; measuring the second light output value; and adjusting the fractional value of the LSB to converge the second light output value with the first light output value.

20 Claims, 3 Drawing Sheets

U.S. PATENT DOCUMENTS

| | | | |
|---|---|---|---|
| 6,498,632 B1 * | 12/2002 | Butterworth et al. | 349/77 |
| 6,619,801 B2 * | 9/2003 | Cho et al. | 353/20 |
| 6,628,263 B1 * | 9/2003 | Konuma et al. | 345/104 |
| 2003/0133060 A1 | 7/2003 | Shimada | |

* cited by examiner

BIT WEIGHTING ALIGNMENT IN A DISPLAY DEVICE

FIELD OF THE INVENTION

The present invention relates generally to digital imaging systems. More specifically, the present invention relates to a system and method for aligning bit weights in digital imaging systems that implement pixel shifting technology.

BACKGROUND OF THE INVENTION

This section is intended to introduce the reader to various aspects of art which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A common problem inherent with digital imaging systems is that they are limited in the number of bits that can be displayed. In other words, their bit depth is finite. This limitation in the number of bits is a resolution limitation causing contouring in the displayed images. Essentially, the number of colors that may be displayed, as well as the range of light intensity, is limited, precluding the displaying of smoother images. In order to increase the resolution of the image display systems the bit depth needs to be increased.

In digital micromirror devices ("DMD") using pixel shift technology, one parameter limiting the bit depth is the value of the least significant bit ("LSB"). The LSB represents the minimum amount of time that a pixel can be switched on for a given frame of video. One technique to achieve better bit depth or to increase the number of bits that can be displayed is to create fractional bits. Parameters such as light intensity may be controlled over time intervals shorter than the time represented by the LSB by, for example, attenuating the light source during the interval an LSB is displayed. However, once these fractional bits are achieved they must be scaled to the LSB in order to obtain a proper video to light transfer curve. Without proper scaling or calibration of the fractional bits, contouring within the image displayed may persist even with the increase in bit depth. Therefore, a system and method for calibrating or properly scaling these fractional bits to the natural LSB is needed.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for bit weighting alignment in a display device. A method for calibrating light comprises: displaying a first video pattern, the first video pattern comprising a first set of pixels divided into a first subset of pixels and a second subset of pixels, the first subset of pixels having a first intensity level, the second subset of pixels having an intensity level corresponding to a fully off state; measuring a first light output value associated with the first video pattern; displaying a second video pattern, the second video pattern comprising a second set of pixels, each of the second set of pixels having a second intensity level corresponding to a fraction of the first intensity level, the fractional value of second intensity level being determined so that a second light output value associated with the second video pattern is intended to equal the first light output; measuring the second light output value; and adjusting the fractional value of the LSB to converge the second light output value with the first light output value.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Figure 1:
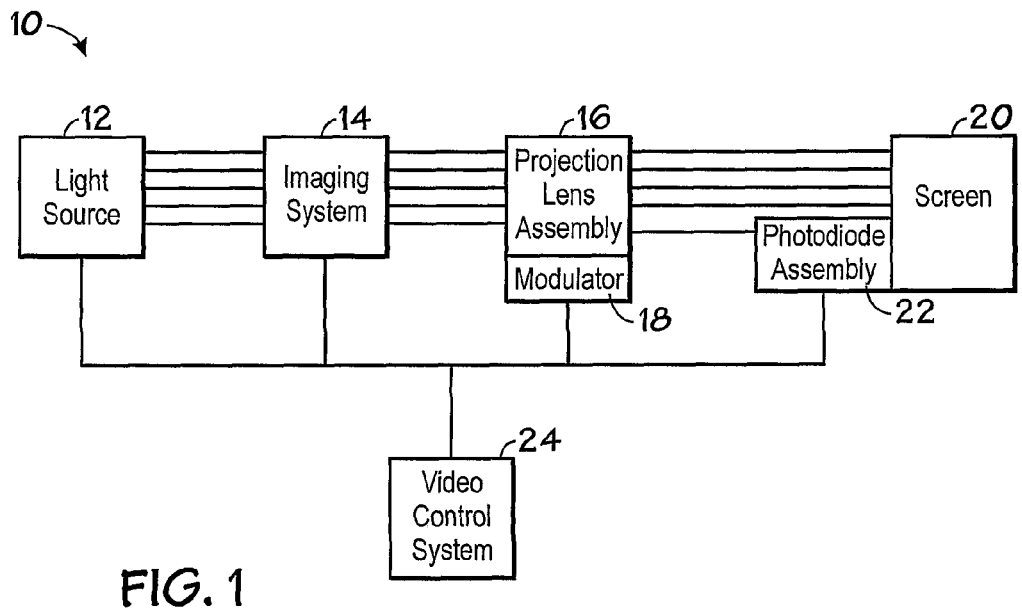
FIG. 1 is a block diagram of an exemplary digital imaging system in accordance with embodiments of the present invention.

Referring to FIG. 1, a block diagram of an exemplary digital imaging system in accordance with one embodiment of the present invention is shown and generally designated by the reference numeral 10. The digital imaging system 10 comprises a light engine 12 that shines or directs light to an imaging system 14. In one embodiment the light engine 12 may include a metal halide lamp, such as an ultra high performance ("UHP") lamp, configured to shine white light.

The imaging system 14 may be a digital micromirror device ("DMD") or a liquid crystal device ("LCD"). In the case of a DMD device, the imaging system may comprise up to one-half million micromirrors or more. The micromirrors are mounted on microscopic hinges that are electrically actuated to tilt the micromirrors between an "on" position and an "off" position. Each micromirror represents a pixel displayed on a screen 20. The minimum time a pixel can be switched on for a given frame of video is commonly referred to as an LSB.

A projection lens assembly 16 controlled by a modulator 18 receives light that passes through or is reflected from the imaging system 14 and directs it to the screen 20. The modulator 18 and the projection lens assembly 16 enable the image display unit to implement pixel shift technology. In pixel shifting, a single pixel may be displayed at multiple positions on the screen 20 by adapting the modulator 18 to slightly tilt a projecting lens along an axis. The movement of the pixels is imperceptible to a human eye due to visual persistence. Thus, a single pixel appears to be multiple pixels and the pixel shifting effectively multiplies the number of pixels available to the digital imaging system 10.

To perform pixel shifting, a video control system 24 may coordinate the movement of the lens through the modulator 18. With a single modulator 18 at least two positions may be achieved for a single pixel. For example, the lens may direct pixels to a certain location on the screen 20. The modulator 18 then manipulates the lens to direct the pixels to a secondary position on the screen 20 and subsequently back to the original position. The procedure is repeated so rapidly that a human eye is unable to detect the movement between the two positions and, as explained previously, the pixel shift technology effectively increases the resolution of image displayed on the screen.

The light passing through the projection lens assembly 16 is directed onto the screen 20 as an image seen by viewers. The image display unit 10 may be designed to provide an overscan, wherein light is projected to an area greater than that visible to users on the screen 20. For example, light may be projected to areas behind a bezel (not shown) of the screen. A photodiode assembly 22 may be situated to receive this light without influencing the image displayed on the screen 20.

The photodiode assembly 22 is configured to detect the amount of light output from the light source 12 in a given video frame. Upon receiving light from the projection lens assembly 16, the photodiode assembly 22 produces a voltage corresponding to the light output. The voltage is converted to a corresponding digital signal and directed to the video control system 24.

The video control system 24 controls images that are displayed on the screen 20. Among other things, as described above and as shown, the video control system controls the light source 12, the modulator and the imaging system 14 to produce the images on the screen 24. In controlling the light source 12, the video control system 24 controls the light output intensity. Specifically, it may decrease the intensity of the light output to achieve a fractional LSB value. Additionally, it may fine tune the light output of the light source 12 in order to properly scale a fractional LSB to a natural LSB value.

Returning to the photodiode assembly 22, it communicates with the video control system 24. Specifically, the photodiode assembly 22 provides feedback to the video control system 24 in the form of a digital signal corresponding to the amount of light output in a given frame of video. The video control system 24 compares the values of digital signals received and then determines whether to increase or decrease the amount of light output by light engine 12 when displaying a fractional LSB, as will be discussed in greater detail below.

Figure 2:
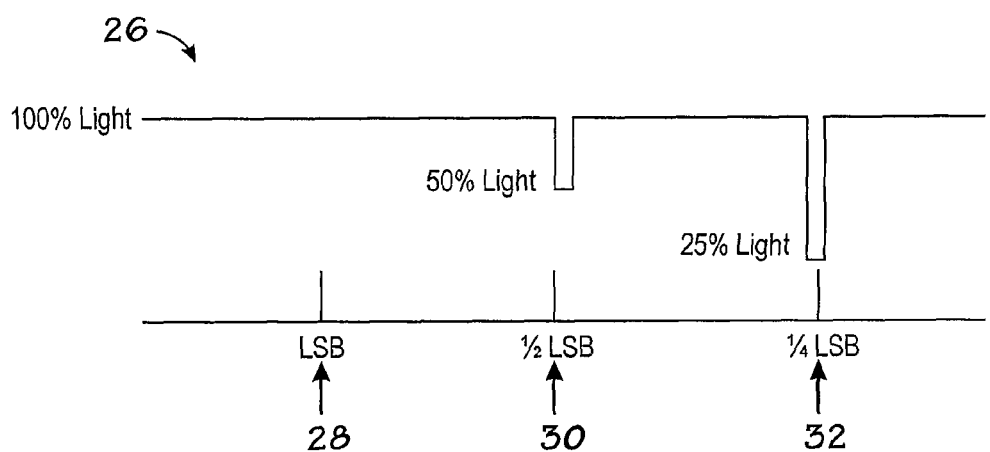
FIG. 2 is an exemplary representation of light output in accordance with embodiments of the present invention.

Turning now to FIG. 2, an exemplary representation of light output in accordance with embodiments of the present invention is displayed and is generally designated by the reference numeral 26. More specifically, the light output shown is relative to a full LSB, the full LSB represents 100% output by the light engine. The full LSB is attenuated to achieve fractional LSBs having ½ and ¼ the light output of an LSB. The light output of a full LSB is shown by LSB 28, where there is no attenuation of the light. As illustrated, the light is attenuated by one half to produce a ½ LSB 30 and by three quarters to produce the ¼ LSB 32. The attenuation of the light output to create fraction LSBs in this manner essentially increases the number of bits available to display an image. After creation, however, the fractional bits must be properly weighted with reference to a natural LSB to help ensure an accurate light transfer curve.

Figure 3:
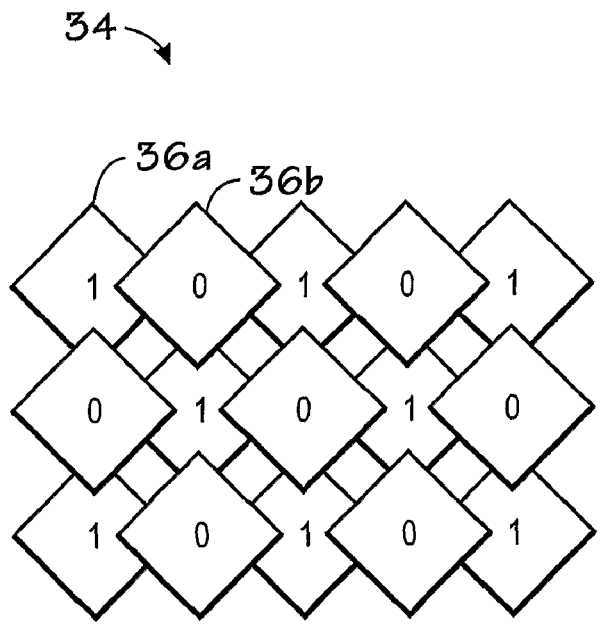
FIG. 3 is an exemplary pixel shift video pattern in accordance with embodiments of the present invention.

With reference to FIG. 3, an exemplary pixel shift video pattern is shown and is generally designated by the reference numeral 34. Specifically, the pixel shift video pattern 34 comprises an array of diamond shaped pixels having a first pixel position 36a and a second pixel position 36b that is shifted from and partially superimposed upon the first pixel position 36a.

In FIG. 3, while the pixels are located in a first pixel position 36a they have a value of one, the one representing the value of one full LSB. Alternatively, while the pixels are located in a second pixel position 36b the pixels have a value of zero, the zero representing zero LSB or no light being directed to the screen. The result of the pixel shift video pattern 34 is that one half of the total pixels making up the video frame have an LSB value of one and the other half have a value of zero. Thus, the total light output of pixel shift video pattern 34 is one-half LSB. The total light output of the video pattern can be measured by the photodiode assembly 22. This natural LSB value may be compared with the fractional bit weight values of fractional pixels, as discussed below.

Figure 4:
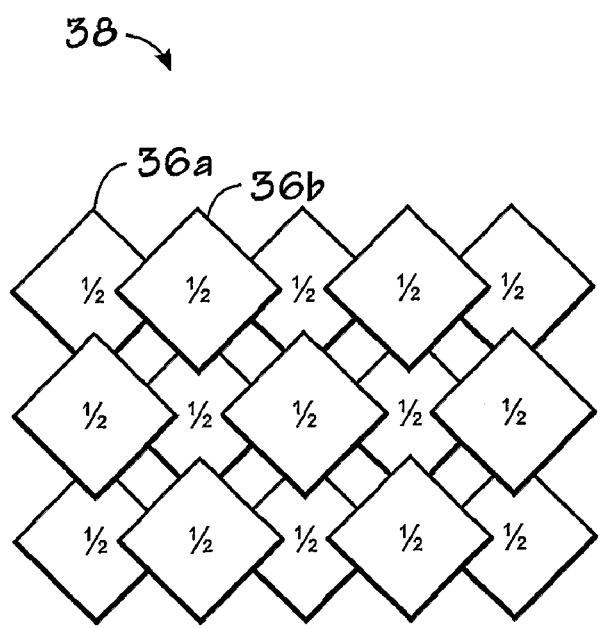
FIG. 4 is an exemplary pixel shift video pattern in accordance with embodiments of the present invention.

FIG. 4 is an exemplary pixel shift video pattern in accordance with embodiments of the present invention and is generally designated by the reference numeral 38. The pixel shift video pattern 38 is identical to the pixel shift video pattern 34 of FIG. 3 in all respects except all of the pixels making up the video frame have a light output value of one-half LSB. Specifically, the pixels while in the first pixel position 36a have a value of one-half LSB and all of the pixels in the second pixel position 36b also have a value of one-half LSB. The total light output of the pixel shift video pattern 38 should equal the one-half LSB of video pattern 34. The total light output from pixel shift video pattern 38 may be measured by the photodiode assembly 22, which produces a voltage level corresponding to the amount of light it receives. The voltage level is converted to a digital signal and sent to the video control system 24.

The video control system 24 compares the one-half LSB value produced from the video pattern 38 with the natural one-half LSB value obtained from the pixel shift video pattern 34 represented in FIG. 3. A comparison of these two pixel shift video patterns enables the video control system 24 to adjust the light output from the light source 12 to calibrate the fractional bits with the natural LSB. The calibration entails converging the value of video pattern 38 to the value of the pixel shift video pattern 34. This weighting of the fractional bits to the natural LSB helps ensure a smoother image and reduces contouring.

Once the one-half LSB light output level is calibrated or properly scaled with the natural LSB, the procedure may be repeated to properly scale other fractions of the LSB such as one fourth LSB. For example, to scale the one-fourth LSB, the calibrated one-half LSB would be used in the place of one LSB in the video pattern 34 of FIG. 3 and the one-fourth LSB would replace the one-half LSB of the video pattern 38 of FIG. 3. All of the other procedures remain as described above.

Figure 5:
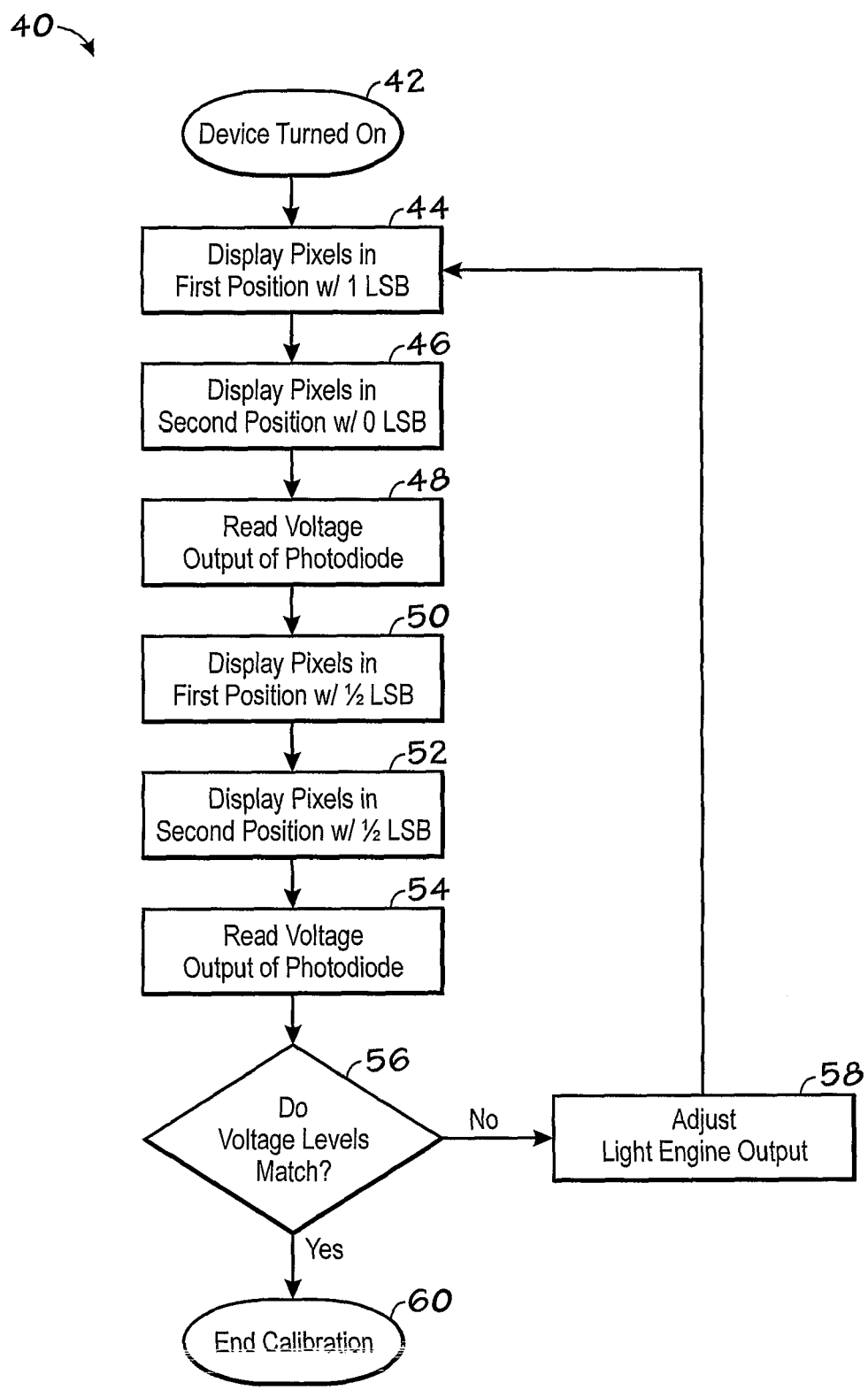
FIG. 5 is a flow chart illustrating an exemplary technique for bit weighting in accordance with embodiments of the present invention.

Turning to FIG. 5, a flow chart illustrating an exemplary technique for bit weighting in accordance with embodiments of the present invention is shown and generally designated by reference numeral 40. Specifically, the flow chart shows the steps of ensuring proper bit weighting of fractional bits in an image display device using pixel shift technology. In one embodiment, the technique 40 may be performed upon start up of the image display unit 10. Alternatively, the video control system 24 and the light engine 12 in conjunction with the photodiode assembly 22 may perform the technique 40 on the fly or while in operation to ensure continued proper fractional bit scaling.

As indicated by block 42, the technique 40 may begin when the device is turned on. Initially, video pattern 34 is made wherein pixels are displayed in the first pixel position 36a with a light output of one LSB, then pixels are displayed in the second pixel position 36b with zero LSB or in a fully off state. As indicated by block 48, a voltage output may be read from the photodiode at this time. This voltage output is representative of the total light output of the pixel shift video pattern 34.

Next, video pattern 38 is made, wherein pixels may be displayed in their first pixel position 36a with one-half LSB and then shifted and displayed in their second pixel position 36b, again with one-half LSB. A voltage may be read from the photodiode assembly 22 as indicated by block 54. This voltage represents the total light output of the pixel shift video pattern 38, where all of the pixels display a one-half LSB. This voltage level is compared with the voltage level of the pixel shift video pattern 34 which was obtained earlier. If the voltage levels do not match, the video control system 24 adjusts the light output of the light engine 12 to converge the voltage level represented in block 54 with the voltage level represented in block 48. For example, if the video pattern 38 produced a higher voltage level than the video pattern 34, the light output of the light source 12 should be further attenuated when displaying a fractional LSB. The technique is repeated until the voltage levels match and the bit weight of the fractional bits are scaled to the natural LSB. When the voltage levels are sufficiently close, the calibration ends.

As previously described, technique 40 may be performed upon an initial start up, or during use. Additionally, this calibration or scaling of the fractional bits may be performed in the factory before the image display unit is shipped to consumers.

While the invention may be susceptible to various modifications and alternative forms, specific embodiments have been shown by way of example in the drawings and described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for calibrating light output in a display device, the method comprising:
   displaying a first video pattern, the first video pattern comprising a first set of pixels divided into a first subset of pixels and a second subset of pixels, the first subset of pixels having a first intensity level, the second subset of pixels having an intensity level corresponding to a fully off state;
   measuring a first light output value associated with the first video pattern;
   displaying a second video pattern, the second video pattern comprising a second set of pixels, each of the second set of pixels having a second intensity level corresponding to a fraction of the first intensity level, the fractional value of second intensity level being determined so that a second light output value associated with the second video pattern is intended to equal the first light output;
   measuring the second light output value; and
   adjusting the fractional value of the LSB to converge the second light output value with the first light output value.

2. The method of claim 1, wherein the first intensity level corresponds to a least significant bit ("LSB") of a DMD array and the second intensity level corresponds to an LSB value of one-half.

3. The method of claim 1, wherein the second subset of pixels are shifted in position relative to the first subset of pixels.

4. The method of claim 1, wherein the first intensity level corresponds to a one-half LSB value of a DMD array and the second intensity level corresponds to an LSB value of one-fourth.

5. The method of claim 1, wherein a light source is adapted to be attenuated to achieve multiple intensity levels.

6. The method of claim 1, wherein the first and second values correspond to voltages produced by photodiodes.

7. The method of claim 1, wherein implementation of the method occurs periodically to help ensure continual proper light transfer curve.

8. A video unit, comprising:
   a light engine that produces a light output;
   an imaging system that receives the light output and processes the light output to create a processed light output;
   a projection lens assembly that receives the processed light output and directs the processed light output to a screen;
   a modulator enabled to tilt the projection lens assembly along an axis;
   a photodiode assembly configured to receive light directed toward the screen and produce a first voltage according to a first video pattern and a second voltage according to a second video pattern; and
   a video control system configured to adjust the light output of the light engine to converge the second voltage with the first voltage.

9. The video unit of claim 8, wherein the imaging system is a digital micromirror device.

10. The video unit of claim 8, wherein the modulator enables the unit to shift pixel position on the screen to create subsets of pixels for the first and second video patterns.

11. The video unit of claim 8,
   wherein the first video pattern comprises a first subset of pixels with an intensity level of one LSB of a DMD array and a second subset of pixels having an intensity level corresponding to a fully off state; and
   wherein the second video pattern comprises pixels having an intensity level of one-half of an LSB of a DMD array.

12. The video unit of claim 8,
   wherein the first video pattern has a first subset of pixels having an intensity level of one-half LSB of a DMD array and a second subset of pixels having an intensity level corresponding to a fully off state; and
   wherein the second video pattern has pixels having an intensity level of one-fourth of an LSB of a DMD array.

13. The video unit of claim 8, wherein the photodiode assembly is adjacent to the screen, but not visible to a viewer.

14. The video unit of claim 8, wherein the first and second voltage levels are converted to a digital signal corresponding to their respective voltage levels.

15. The video unit of claim 8, wherein the light engine is adapted to produce an attenuated light output corresponding to control signals.

16. A video unit comprising:
   means for creating a first video pattern having pixels in a first position with a first intensity level and shifting the pixels relative to the first position to a second position and having an intensity level corresponding to an off state in the second position;

means for creating a second video pattern having pixels in a first and second position wherein the value of the pixels of the second video pattern have an intensity level corresponding to a fraction of the first intensity level;

means for measuring a value corresponding to the light output of the first and second video patterns and;

means for comparing the value of the second video pattern with the first video pattern; and means for adjusting the second video pattern so that the value corresponding to the light output of the second video pattern converges to the value of the first video pattern.

17. The video unit of claim 16, further comprising means for producing pixels with a light intensity equal to an LSB value of a DMD array.

18. The video unit of claim 16, further comprising means for producing pixels with a light intensity equal to one-half of an LSB value of a DMD array.

19. The video unit of claim 16, further comprising means for producing pixels with a light intensity equal to one-fourth of a LSB value of a DMD array.

20. The video unit of claim 16, further comprising means for fine tuning the light output of a light engine to properly scale fractional bits.

* * * * *